United States Patent [19]
Cook et al.

[11] Patent Number: 5,809,976
[45] Date of Patent: Sep. 22, 1998

[54] VENT CONTROL VALVING FOR FUEL VAPOR RECOVERY SYSTEM

[75] Inventors: John E. Cook; Paul Perry, both of Chatham, Canada

[73] Assignee: Siemens Canada Limited, Mississauga, Canada

[21] Appl. No.: 565,656

[22] Filed: Nov. 29, 1995

[51] Int. Cl.$^6$ ............................................. F02M 37/04
[52] U.S. Cl. .................. 123/516; 137/43; 137/39
[58] Field of Search ........................... 123/516, 514, 123/509, 510, 520, 519, 518; 137/565, 572

[56] References Cited

U.S. PATENT DOCUMENTS

| | | | |
|---|---|---|---|
| 4,085,721 | 4/1978 | Vardi et al. | 123/136 |
| 4,149,504 | 4/1979 | Walters | 123/136 |
| 4,598,686 | 7/1986 | Lupoli et al. | 123/519 |
| 4,717,401 | 1/1988 | Lupoli et al. | 55/208 |
| 4,719,949 | 1/1988 | Mears | 141/301 |
| 4,748,959 | 6/1988 | Cook et al. | 123/520 |
| 4,796,593 | 1/1989 | Woodcock et al. | 123/518 |
| 4,813,453 | 3/1989 | Jenkins et al. | 137/588 |
| 4,877,001 | 10/1989 | Kenealy et al. | 123/519 |
| 4,877,146 | 10/1989 | Harris | 220/85 |
| 4,887,578 | 12/1989 | Woodcock | 123/516 |
| 4,903,672 | 2/1990 | MacKinnon | 123/520 |
| 5,012,838 | 5/1991 | Kawase | 123/520 |
| 5,024,687 | 6/1991 | Waller | 55/316 |
| 5,040,577 | 8/1991 | Pope | 141/59 |
| 5,048,493 | 9/1991 | Orzel et al. | 123/489 |
| 5,054,508 | 10/1991 | Benjey | 137/43 |
| 5,054,520 | 10/1991 | Sherwood et al. | 137/587 |
| 5,054,528 | 10/1991 | Saltoh | 141/59 |
| 5,058,693 | 10/1991 | Murdock et al. | 180/69 |
| 5,080,078 | 1/1992 | Hamburg | 123/521 |
| 5,099,880 | 3/1992 | Szlaga | 123/519 |
| 5,111,795 | 5/1992 | Thompson | 123/519 |
| 5,123,459 | 6/1992 | Toshihiro | 141/59 |
| 5,151,111 | 9/1992 | Tees et al. | 55/164 |
| 5,156,178 | 10/1992 | Harris | 137/43 |
| 5,181,497 | 1/1993 | Matsushita et al. | 123/520 |
| 5,183,087 | 2/1993 | Aubel et al. | 141/59 |
| 5,194,075 | 3/1993 | Matsuoka | 55/195 |
| 5,215,132 | 6/1993 | Kobayashi | 141/302 |
| 5,217,051 | 6/1993 | Simpson et al. | 141/59 |
| 5,220,898 | 6/1993 | Kidokoro | 123/520 |
| 5,234,013 | 8/1993 | Roetker et al. | 137/43 |
| 5,234,022 | 8/1993 | Harris | 137/498 |
| 5,235,955 | 8/1993 | Osaki | 123/520 |
| 5,237,980 | 8/1993 | Gillier | 123/520 |
| 5,244,022 | 9/1993 | Gimby | 141/301 |
| 5,255,735 | 10/1993 | Raghava et al. | 165/111 |
| 5,261,439 | 11/1993 | Harris | 123/516 |
| 5,280,775 | 1/1994 | Tanamura et al. | 123/518 |
| 5,297,528 | 3/1994 | Mukai | 123/518 |
| 5,318,069 | 6/1994 | Harris | 123/519 |
| 5,368,001 | 11/1994 | Roche | 123/510 |
| 5,375,633 | 12/1994 | Bucci | 141/59 |
| 5,388,611 | 2/1995 | Harris | 123/519 |
| 5,392,804 | 2/1995 | Kondo et al. | 137/202 |
| 5,398,722 | 3/1995 | Ramsey | 137/587 |
| 5,404,906 | 4/1995 | Aoshima et al. | 137/587 |
| 5,417,240 | 5/1995 | Benjey | 123/519 |
| 5,579,742 | 12/1996 | Yamazaki | 123/516 |

*Primary Examiner*—Carl S. Miller

[57] ABSTRACT

Vent control valving is described for an automotive fuel vapor recovery system, in which a baffle arrangement prevents or otherwise restricts liquid fuel from entering a vent passage to a charcoal canister. A sealing arrangement prevents or otherwise restricts the escape of fuel when the vehicle is turned at a sufficient rate of turn, operated on a sufficient incline, or rolled over, and prevents overfilling of the tank, which could allow liquid fuel to enter the vent passage. In one embodiment, a differential pressure is developed across a diaphragm during refueling which unseats the diaphragm from a seat to allow unrestricted venting during refueling, restricted venting is established whenever the diaphragm is seated to limited the flow of vapors to the canister.

32 Claims, 6 Drawing Sheets

VENT CONTROL VALVING FOR FUEL VAPOR RECOVERY SYSTEM

BACKGROUND OF THE INVENTION

This invention concerns fuel vapor recovery systems associated with automotive vehicle engine fuel tanks that store volatile liquid fuel for use by internal combustion engines that power such vehicles. Such systems is designed to lessen or prevent the release of fuel vapor to the atmosphere, while allowing venting of the fuel tank during various operating conditions so that excessive tank pressures do not develop.

A known vapor recovery systems, uses a vapor collector canister containing charcoal or other adsorbent material and connected to a vapor vent passage. The charcoal adsorbs the vented fuel vapors during refueling or when the vehicle is not being operated. When the engine is running, the fuel vapors are drawn into the engine intake manifold, then into the engine cylinders where they, along with the fuel introduced by an engine fuel delivery system are combusted. The purging of the charcoal canister prepares the canister for adsorbing fuel vapors when the engine is not running.

For example, U.S. Pat. No. 5,174,265 entitled "Canister System" and U.S. Pat. No. 5,441,031 for an "Evaporative Fuel Processing System for Internal Combustion Engine" concern such systems.

Liquid fuel should not enter the vapor canister through the vent passage such as during refueling or extreme turning maneuvers, with the vehicle disposed on a steep incline, or when the vehicle rolls over. If liquid fuel wets the charcoal, the latter will not function properly as a vapor adsorbing medium. Valving arrangement have been used to at least limit charcoal wetting.

U.S. Pat. No. 5,215,110 entitled "Fuel Tank Vent System And Diaphragm Valve For Such System" and U.S. Pat. No. 4,753,262 entitled "Fuel System Vent Valve Having Roll-Over Closure With Improved Re-Opening Action For Venting" concern vent systems which use valves for rollover protection system.

To limit fuel from entering the canister, a restricted vent passage may be used, except during refueling to avoid saturating the charcoal. During refueling, however, large vapor volumes are displaced and a large capacity vent passage avoids an excessive back pressure buildup. In other systems, two separate venting passages have been used, but because separate liquid fuel escape prevention devices are necessary, the associated valving may be quite complex and affect system reliability. See for example the system described in U.S. Pat. No. 5,462,100 entitled "Fuel Fill Vapor Recovery System With Differential Pressure Control Valve."

Accordingly, an object of the present invention is to provide simpler, compact valving for a fuel vapor recovery vent system, which prevents or reduces the amount of liquid fuel entering the canister vent passage.

Another object of the invention is to provide valving which allows restricted venting during normal vehicle operation, but which provides large capacity venting during refueling.

SUMMARY OF THE INVENTION

One general aspect of the invention relates to a vent control valving assembly adapted to mount on a fuel tank and form a portion of a fuel vapor recovery system for the fuel tank, said valving assembly comprising: a valve casing adapted to mount on the fuel tank to have at least a portion thereof extending downwardly into the fuel tank, said valve casing defining a hollow interior space and comprising a wall that is disposed across said valve casing hollow interior space and that has a vent opening for communicating with a vent outlet of the casing; a bottom piece closing a lower end of said valve casing, said bottom piece having at least one opening allowing fuel in the tank to enter said valve casing and rise to a fuel level corresponding to that in the fuel tank; a float slidably disposed in said valve casing; and a seal assembly comprising a seal operable by said float for positioning against said valve casing wall by said float when said float has risen to a predetermined fuel level to seal said vent opening; said seal assembly including an equalizing orifice extending past said seal for allowing said seal to be released when said float falls as the fuel level in the tank declines below the predetermined level; and said float including a main portion slidable in said valve casing and a central tubular portion projecting from said main portion, and said seal assembly including a sleeve slidably received in said tubular portion, said seal being disposed on an upper end of said sleeve and resting on a top of said central tubular portion of said float.

Another general aspect of the invention relates to a vent control valving assembly that is adapted to mount on a fuel tank having a filler neck and to form a portion of a assembly comprising: a valve casing; said valve casing comprising a first chamber adapted to have fuel vapor pressure in the tank communicated thereto; a diaphragm mounted in said casing and having a side thereof defining in part said first chamber; said valve casing comprising a second chamber defined in part by an opposite side of said diaphragm and adapted to be communicated to an entrance of the filler neck; said valve casing comprising a diaphragm seat in said first chamber aligned with said diaphragm, said diaphragm being selectively movable to seated and unseated positions relative to said diaphragm seat in accordance with gas pressures acting on the sides of the diaphragm; a bias assembly that urges said diaphragm to seated position on the seat when gas pressure is equalized on each side of the diaphragm; a flow path that extends past the diaphragm seat to provide restrictive communication to a vent outlet of the casing when the diaphragm is seated on said diaphragm seat; the flow path being unrestricted when said diaphragm is in unseated position away from said diaphragm seat during refueling of the fuel tank; and said diaphragm seat comprising a rim against which said diaphragm rests in seated position, said rim comprising a restrictive opening providing restriction in the flow path when the diaphragm is in seated position.

Another general aspect of the invention relates to a vent control valving assembly that is adapted to mount on a fuel tank having a filler neck and to form a portion of a fuel vapor recovery system for the fuel tank, said valving assembly comprising: a valve casing; said valve casing comprising a first chamber adapted to have the fuel vapor pressure in the tank communicated thereto; a diaphragm mounted in said casing and having a side thereof defining in part said first chamber; said valve casing comprising a second chamber defined in part by an opposite side of said diaphragm and adapted to be communicated to an entrance of the filler neck; said valve casing comprising a diaphragm seat in said first chamber and aligned with said diaphragm, said diaphragm being selectively movable to seated and unseated positions relative to said diaphragm seat in accordance with gas pressure acting on the sides of the diaphragm; a bias assembly that urges said diaphragm to seated position on the seat when gas pressure is equalized on each side of the diaphragm; a restrictive flow path extending across said diaphragm seat to provide restrictive communication to a vent outlet of the casing when said diaphragm is in seated position on said diaphragm seat; an unrestricted flow path extending past said diaphragm when said diaphragm is in unseated position away from said diaphragm seat during refueling of the fuel tank, whereby venting to the vent outlet is restricted when the tank is not being refueled, and venting to the vent outlet is unrestricted when the tank is not being refueled; said diaphragm comprising a pressure equalization orifice; and further including a seal for closing said equalization orifice when said diaphragm moves to a maximally unseated position away from the seat.

Another general aspect of the invention relates to a vent control valving assembly adapted to mount on a fuel tank and form a portion of a fuel vapor recovery system for the fuel tank, said valving assembly comprising: a hollow valve casing having at least a portion adapted to be disposed in an upper region of the fuel tank; said casing portion comprising a perimeter wall having a series of window openings; said casing comprising a transverse wall extending across said casing above the window openings; a vent opening in said casing transverse wall communicating with a vent outlet of the casing; and a baffle arrangement including a skirt depending from said transverse wall within said perimeter wall and interposed between all of said window openings and said vent opening, whereby said skirt blocks liquid fuel from splashing through any of said window openings and directly into said vent opening.

Another general aspect of the invention relates to a vent control valving assembly that is adapted to mount on a fuel tank having a filler neck and to form a portion of a fuel vapor recovery system for the fuel tank, said valving assembly comprising: a valve casing; said valve casing comprising a first chamber adapted to have fuel vapor pressure in the tank communicated thereto; a diaphragm mounted in said casing and comprising a side defining in part said first chamber; said valve casing comprising a second chamber defined in part by an opposite side of said diaphragm and adapted to be communicated to an entrance of the filler neck; said valve casing comprising a diaphragm seat in said first chamber aligned with said diaphragm, said diaphragm being selectively movable to seated and unseated positions relative to said diaphragm seat in accordance with gas pressures acting on the sides of the diaphragm; a bias assembly that urges said diaphragm to seated position on said diaphragm seat when gas pressure is equalized on each side of the diaphragm; an unrestricted flow path extending past said diaphragm when the diaphragm is in unseated position away from said diaphragm seat due to gas pressure differential acting on said diaphragm as a result of fuel being introduced into the fuel tank through the filler neck, whereby venting is unrestricted during refueling of the tank; said diaphragm comprising an equalization orifice; and a seal for closing said orifice when said diaphragm is in maximally unseated position away from said diaphragm seat.

Another general aspect of the invention relates to a fuel tank vent control valve comprising: a valve casing comprising a vent outlet; said casing comprising a first chamber adapted to be communicated to an interior of a fuel tank; a diaphragm mounted in said casing and comprising a side defining in part said first chamber; said casing comprising a second chamber defined in part by an opposite side of said diaphragm; a diaphragm seat in said first chamber aligned with said diaphragm, said diaphragm being movable to seated and unseated positions relative to said diaphragm seat; a bias assembly that urges said diaphragm to seated position on said seat when gas pressure is equalized on each side of the diaphragm; a restrictive flow path extending across said diaphragm seat to said vent outlet when said diaphragm is in seated position on said diaphragm seat; an unrestricted flow path extending past said diaphragm when said diaphragm is in unseated position away from said diaphragm seat by gas pressure differential acting on said diaphragm as a result of fuel being introduced into the fuel tank during refueling, whereby venting is restricted when the fuel tank is not being refueled, and venting is unrestricted when the fuel tank is being refueled; and said diaphragm seat comprising a rim that is defined in said valve casing, said diaphragm resting on the rim when the diaphragm is in seated position, and said rim comprising a notch providing the restrictive flow path.

Another general aspect of the invention relates to a fuel tank vent control valve comprising: a valve casing having a vent outlet; a first chamber in said valve casing diaphragm mounted in said casing and comprising a side defining in part said first chamber; a second chamber in said valve casing defined in part by an opposite side of said diaphragm; a diaphragm seat in said first chamber aligned with said diaphragm, said diaphragm being movable to seated and unseated positions relative to said diaphragm seat; a bias assembly that urges said diaphragm to seated position on said seat when gas pressure is equalized on each side of the diaphragm; a restrictive flow path extending across said diaphragm seat to said vent outlet when said diaphragm is in seated position on said diaphragm seat; an unrestricted flow path extending past said diaphragm to the vent outlet when said diaphragm is moved to unseated position away from said diaphragm seat by gas pressure differential acting on said diaphragm during refueling of the tank, whereby venting to the vent outlet is restricted when the fuel tank is not being refueled, and venting to the vent outlet is unrestricted when the fuel tank is being refueled; and the diaphragm comprising a pressure equalization orifice; and further including a seal for closing said equalization orifice when said diaphragm moves to maximally unseated position away from the seat.

Another general aspect of the invention relates to a fuel tank vent control valve comprising: a valve casing comprising a wall bounding a hollow interior space into and from which fuel can ingress and egress and a vapor vent opening through a portion of the wall for venting fuel vapor from the hollow interior space; a seal assembly for sealing said vapor vent opening; a float that is disposed in said hollow interior space and that carries said seal assembly, said float including an inverted cup projecting away from said vapor vent opening, and said float including a tubular portion projecting from said cup toward said vapor vent opening; and said seal assembly including a sleeve slidably received in said tubular portion, and a seal disposed on a vertically upper end of said sleeve and resting on a vertically upper end of said tubular portion.

Another general aspect of the invention relates to a fuel tank vent control valve comprising: a valve casing comprising a wall bounding a hollow interior space into and from which fuel can ingress and egress and a vapor vent opening through a portion of the wall for venting fuel vapor from the hollow interior space; a seal assembly for sealing said vapor vent opening; a float that is disposed in said hollow interior space, that carries said seal assembly, and that comprises a cup projecting invertedly away from the vapor vent opening; and said casing comprising a wall comprising a stop that is abutted by a rim of said cup to define a limit of travel for said float away from said vapor vent opening.

Another general aspect of the invention relates to a fuel tank vent control valve comprising: a valve casing comprising a wall bounding a hollow interior space into and from which fuel can ingress and egress, and a vapor vent opening through a portion of the wall for venting fuel vapor from the hollow interior space; a seal assembly for sealing said vapor vent opening; a float that is disposed in said hollow interior space and that carries said seal assembly, said float including a cup projecting invertedly away from said vapor vent opening; a passage having an entrance that is open to the hollow interior space and an exit that is open through said seal assembly to said vapor vent opening; a gravity-responsive mechanism that closes said passage when the attitude of said casing changes by a predetermined amount from vertical; and said float including a central tubular portion projecting from said cup toward said vapor vent opening, said tubular portion forming a portion of said passage, and said gravity-responsive mechanism comprising a plunger extending within said tubular portion for selectively engaging the seal assembly.

Another general aspect of the invention relates to a fuel tank vent control valve comprising: a valve casing comprising a wall bounding a hollow interior space into and from which fuel can ingress and egress, and a vapor vent opening through a portion of the wall for venting fuel vapor from the hollow interior space; a float that reciprocates between a first position and a second position within said casing; a seal operated by the float for sealing said vapor vent opening when said float is in the first position; said casing wall comprising a stop which said float abuts in the second position; and said float including a cup projecting invertedly away from said vapor vent opening, said cup abutting said stop when the float is in the second position.

Another general aspect of the invention relates to a fuel tank vent control valve comprising: a valve casing comprising a vapor vent opening for venting fuel vapor from a hollow space of the casing into and from which fuel can ingress and egress; a float that reciprocates between a first position and a second position within said casing and that comprises a tubular portion; a seal operated by the float for sealing said vapor vent opening when said float is in the first position; said casing comprising a stop which said float abuts in the second position; and the seal being part of a seal assembly that includes a sleeve slidably received in said tubular portion, and said seal being disposed on a vertically upper end of said tubular portion and resting on a vertically upper end of said tubular portion.

DETAILED DESCRIPTION

Figure 1:
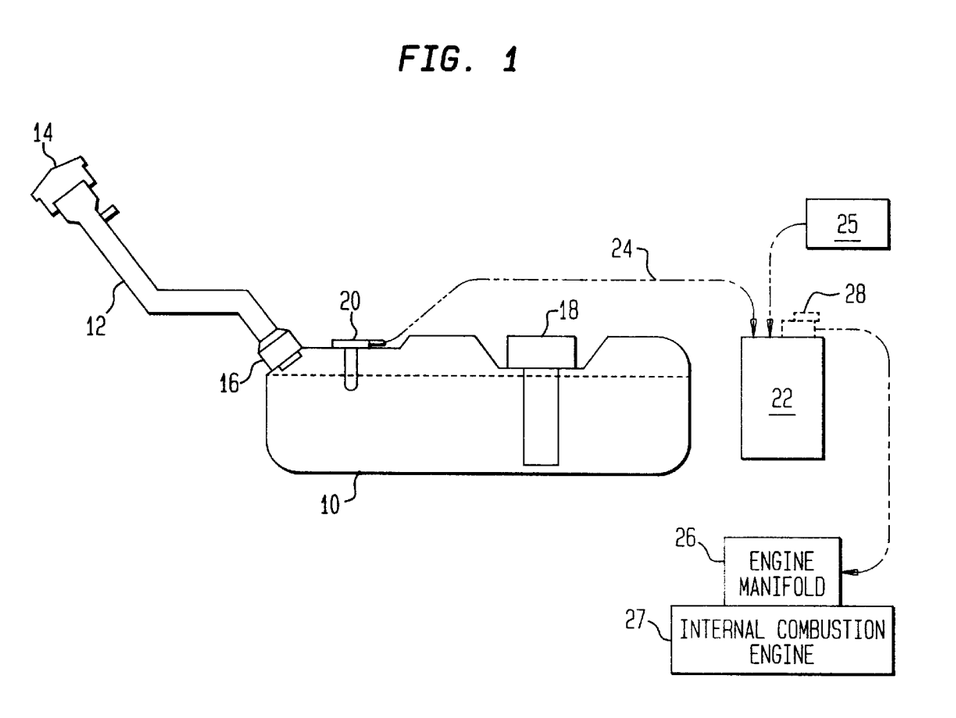
FIG. 1 is a schematic diagram of a fuel tank vapor recovery system using a vent control valving assembly according to the present invention.

FIG. 1 schematically depicts a vapor recovery system for a fuel tank 10, which is adapted to be filled via a filler neck 12 shown closed by a removable cap 14. A check valve 16 is provided in filler neck 12 and opens into fuel tank 10. A fuel pump 18 pumps fuel from tank 10 to an internal combustion engine 27 in the conventional fashion.

A vent control valving assembly 20 controls venting of vapors from interior of the fuel tank 10 to a canister 22 which contains charcoal or other fuel adsorbent material that receives the fuel vapors through a vent line 24. A leak detection pump LDP system 25 that pressurizes the system after each startup to detect any leaks may also be included. Leak detection pump system 25 is known in the art and is not described in detail herein.

Canister 22 is connected to an intake manifold 26 of engine 27 via a purge solenoid 28, also known in the art. Solenoid 28 enables proportioned communication with canister 22 during different engine operating conditions. In particular, communication is increased for more open throttle positions and is reduced for less open throttle positions so that the amount of fuel vapor drawn into the engine is proportioned to the capacity of the engine to burn the vapor and achieve proper engine performance.

Figure 2:
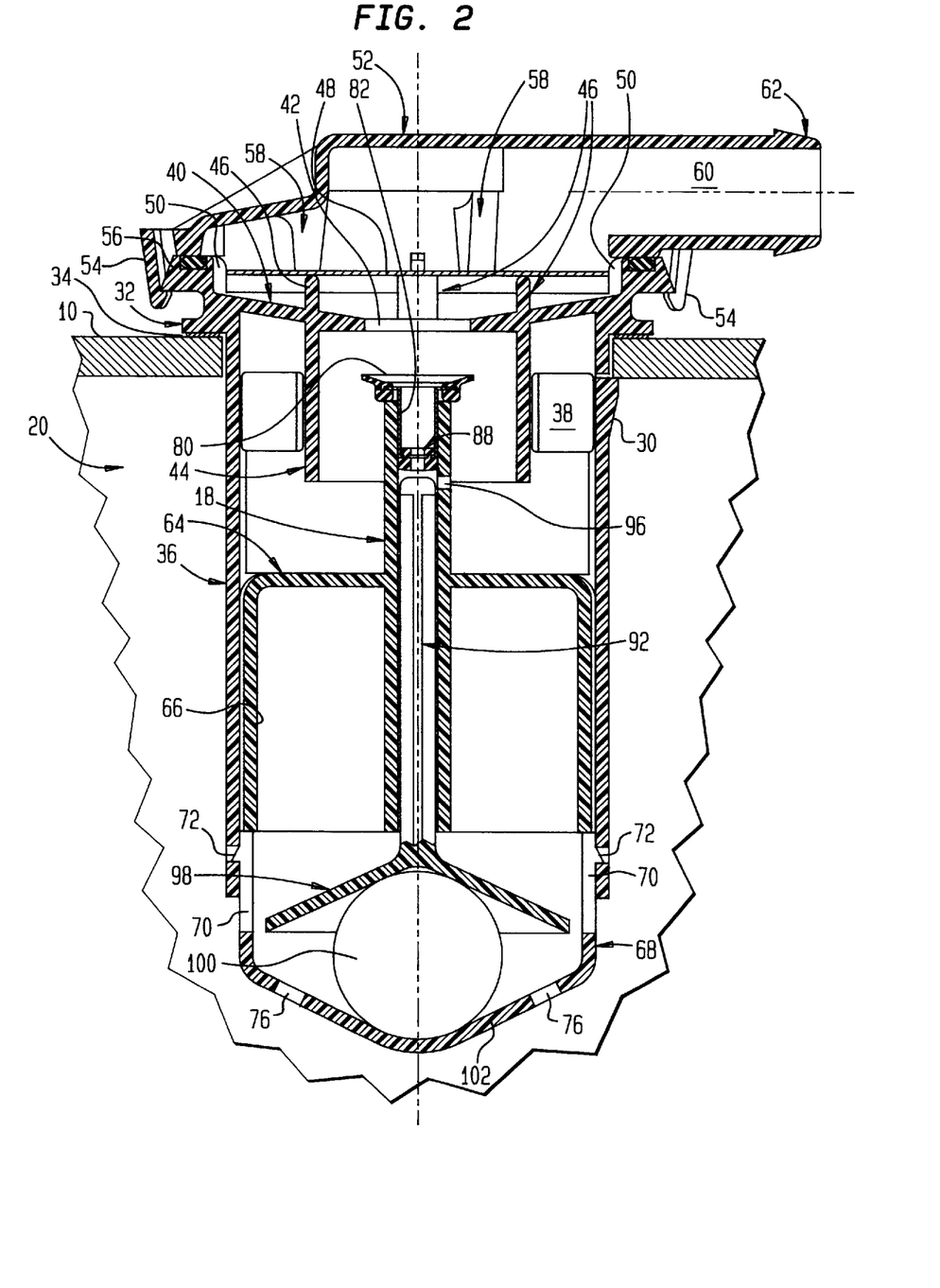
FIG. 2 is a sectional view taken through a first embodiment of the vent control valving.
Figure 3:
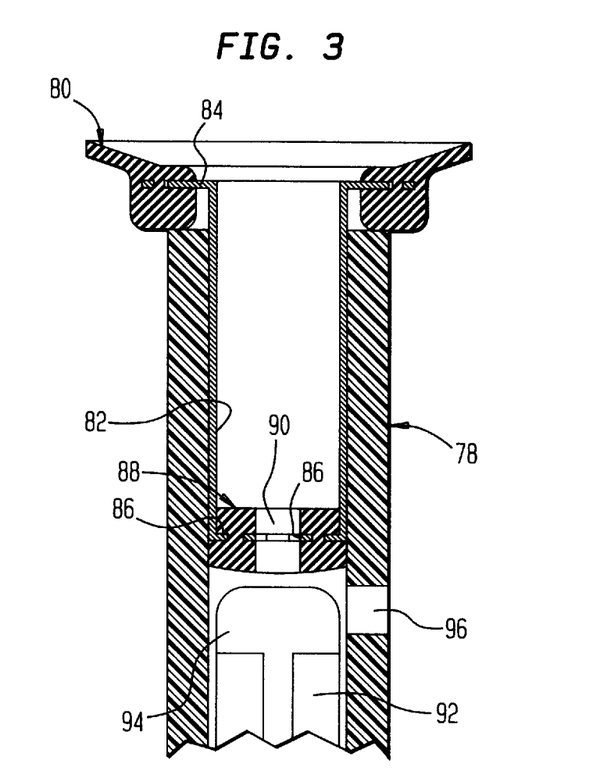
FIG. 3 is an enlarged sectional view of a portion of the vent control valving assembly shown in FIG. 2.
Figure 4:
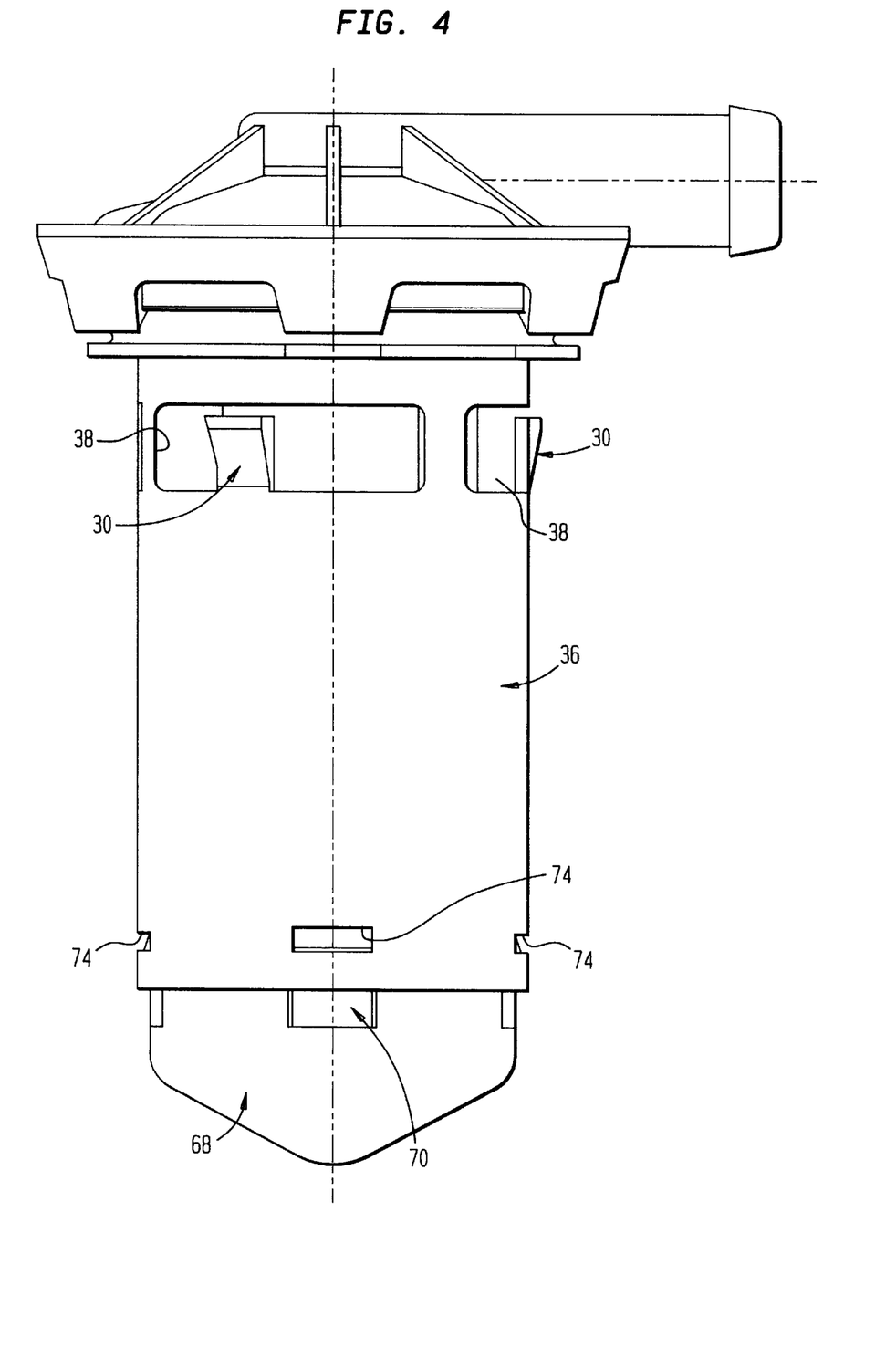
FIG. 4 is an external side elevational view of the vent control valving assembly shown in FIGS. 2 and 3.

FIGS. 2 to 4 show the details of the vent control valving assembly 20, mounted in an upper wall of fuel tank 10 by a series of spring fingers that are molded in a hollow cylindrical valve casing 36 and that hold a flange 32 formed in casing 36 against a gasket 34 positioned over the margin of an opening in top wall of the tank 10. Spring fingers 30 are each centered within a respective one of a series of venting windows 38 spaced about the circumference of an upper part of casing 36. Windows 38 allow fuel vapors to pass into the interior of valve casing 36. Casing 36 comprises an imaginary longitudinal axis AX that is disposed generally vertically when the vehicle is resting on a horizontal surface.

A 36 has a horizontal top wall 40 extends across the upper end of casing 36. A vent hole 42 is formed in the center of top wall 40 and is surrounded by a downwardly extending skirt 44 which is interposed between windows 38 and vent hole 42 so as to at lest reduce oversplash during refueling and sloshing of fuel in tank, and to provide a baffle arrangement to at least reduce the amount of fuel from passing through the vent hole 42.

A series of circumferentially spaced, upwardly projecting fingers 46 surround vent hole 42 and support a deflector disc 48. Deflector disc 48 is centered over vent hole 42 by a series of ribs 50 extending radically inward from the inner perimeter of casing 36. A cap 52 is attached to the top of casing 36 by a series of integral fingers 54 hooked onto the lower surface of an upper flange 56 formed on upper end of the casing 36. Hold-down fingers 58 integral with inside of the cap 52 engage the upper surface of deflector disc 48 to hold the latter on fingers 46. A venting flow path is defined by spaces between fingers 46 and ribs 50 leading to an exit passage 60 in a hose barb 62 integral with cap 52. A hose connection to hose barb 62 forms the vent line 24 to canister 22.

Casing 36 also slidably receives a cylindrical float 64, having an outer lower, cylindrical portion 66, configured as an inverted cup. The bottom of valve casing 36 receives a bottom piece 68 having a conically shaped bottom wall 102. Bottom piece 68 fits into the bottom end of casing 36 and is held with tabs 70, each having a lip 72 snapped into a mating slot 74. The bottom of float 64 normally rests on top edge surface of the bottom piece 68. A series of holes 76 allow fuel to enter bottom piece 68 and valve casing 36 when the fuel level reaches the valve assembly 20, such that float 64 will rise as refueling continues.

Float 64 also has a tubular center portion 78 extending both above and within lower portion 66. A seal assembly comprises an annular closer seal 80 is attached to or otherwise associated with a thin metal sleeve 82. Sleeve 82 is slidably received into the upper end of tubular portion 78. Seal 80 is made of flexible material, such as rubber or a suitable plastic. An out-turned flange 84 (FIG. 3) of sleeve 82 is engaged by seal 80. The lower end of sleeve 82 has in-turned fingers 86 engaged by a sealing plug 88 formed with a vent orifice 90. The seal assembly thereby further includes plug 88. A ribbed operating plunger 92 is slidably received in tubular portion 78 of float 64. Plunger 92 has an upper head 94 for engaging sealing plug 88 to seal the vent orifice 90.

One or more venting holes 96 are formed in the tubular portion 78 to allows restricted venting of the fuel tank interior through orifice 90, the center of annular seal 80, and the vent hole 42, when the seal 80 is pressed against the lower surface of casing top wall 40. That condition is established when the float 64 rises sufficiently as the fuel level reaches the maximum fill level in tank 10. Orifice 90 restricts vapor outflow such that a back pressure is created in tank 10 to shut off continued fueling through a fill nozzle (not shown).

FIG. 2 shows that plunger 92 has an outwardly flared cup 98 on the lower end engaging a steel inertia ball 100, resting at the center of conically shaped bottom wall 102 of a bottom piece 68. When the vehicle is cornered at a sufficient rate of turn (or when the vehicle is inclined at a sufficient angle), the attitude of casing axis AX may increasingly depart from vertical. A result of a sufficiently large departure from vertical may be that ball 100 rolls up the wall 102, raising plunger 92 and lifting seal 80 against the lower surface of top wall 40 to also seal orifice 90 and hence to reduce or otherwise limit fuel entering into the vent passage. Similarly, if vehicle rolls over, the ball 100 moves resting in the center of cup 98 to force float 64 to seal vent hole 42 and plunger 92 to close orifice 90. After float 64 or plunger 92 has dropped orifice 90 also allows seal 80 to be lowered, by allowing pressure equalization.

Figure 1A:
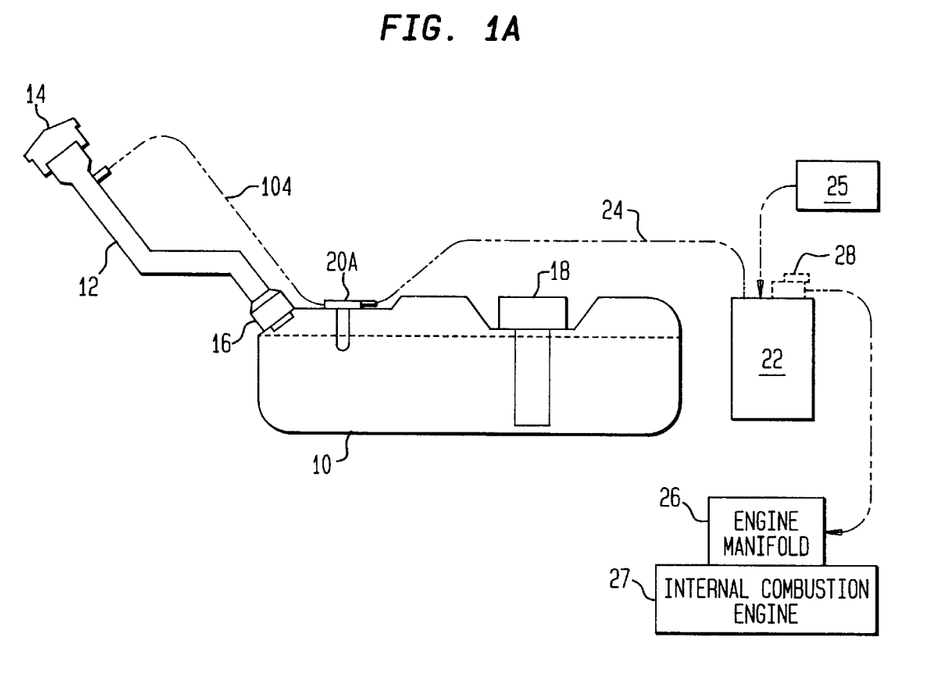
FIG. 1A is a schematic diagram of a fuel tank vapor recovery system using an alternate embodiment of a vent control valving assembly according to the present invention.
Figure 5:
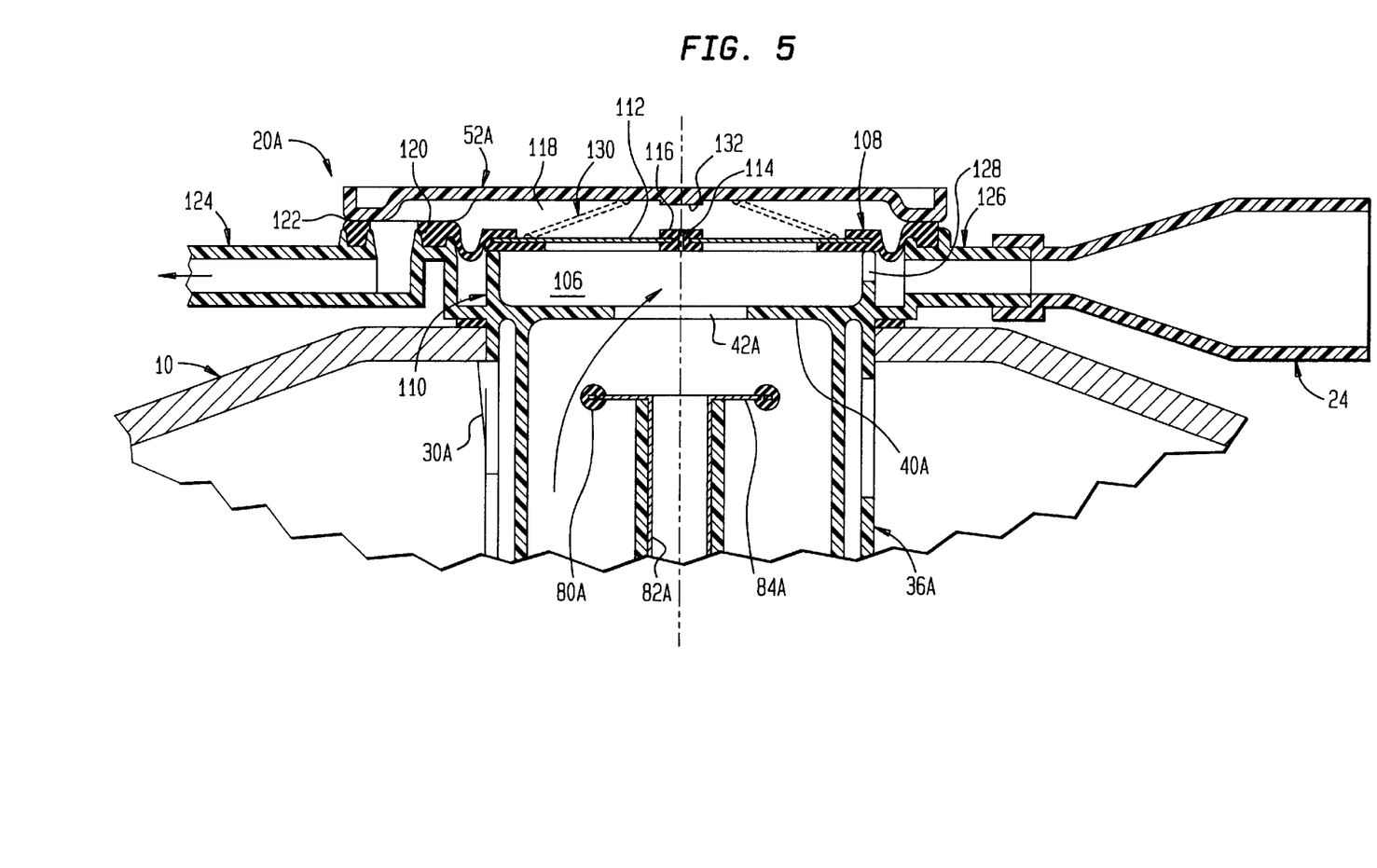
FIG. 5 is a partial sectional view of vent control valving according to an alternate embodiment of the invention.

FIGS. 1A and 5 show an alternate embodiment that features an arrangement for establishing a restricted venting under various conditions, but allows unrestricted or free venting during refueling.

This is done by using a filler neck vent line 104 connected to filler neck 12 above check valve 14 vent line 104 extends to a modified form of a vent control valving assembly 20A, only the upper portion of which is shown in FIG. 5. The remaining portions are similar to those of the above-described embodiment and identified by the same base numeral used in the earlier embodiment suffixed by the letter "A". A first chamber space 106 is defined above vent hole 42A by a flexible annular diaphragm 108 resting on the lip of an upwardly extending rim 110 defining a diaphragm seat. A disc 112 engages the diaphragm 108 to close off the inner hole therein. A plug 114 formed with an equalizing orifice 116 is fit into the center hole of disc 112. Diaphragm 108 and disc 112 define an upper chamber space 118 beneath cap 52A. Cap 52A clamps the periphery of diaphragm 108 in an annular channel 120 formed into the upper wall portion of casing 36A. Cap 52A also engages a seal 122 disposed in an outer groove.

An integrally formed hose barb fitting 124 enables connection to filler neck vent line 104 and an integrally formed hose barb fitting 126 enables connection to vent line 24. A notch 128 is formed in rim 110 to allow restricted venting when diaphragm 108 is in the seated, sealing position shown. A spring 130 urges diaphragm 108 to the seated, sealing position.

When filler cap 14 is in place, the pressures in chamber spaces 106 and 118 equalize, so that diaphragm 108 seals about the lip of rim 110 and venting through notch 128 is restricted. When filler cap 14 is removed and refueling begins, the vapor pressure in tank 10 becomes greater than the atmospheric pressure in vent line 104, causing diaphragm 108 to unseat from rim 110, and allowing free or unrestricted venting and minimal back pressure.

A sealing surface 132 is formed inside cap 52A, aligned with plug 114 and orifice 116. When diaphragm 108 is displaced upwardly during refueling, orifice 116 is sealed, preventing displaced fuel vapors from passing through vent line 104. Once refueling is complete and filler cap 14 is replaced, the pressures on each side of diaphragm 108 equalize because interior of tank 10 equalizes to again restrict venting by spring 130 seating diaphragm 108 on rim 110. Equalizing orifice 116 generally prevents, or at least reduces, transient pressure differentials.

It should be understood that all of the described requirements for a vapor recovery venting system are provided by the vent control valving assembly of the present invention. Liquid fuel is prevented or at least restricted from reaching the vent passage and canister by splashing through the vent opening, or by overfilling the tank, or by vehicle turning maneuvers or rollovers. In the alternate embodiment, restricted venting is generally maintained, except during refueling when unrestricted venting is automatically established.

We claim:

1. A vent control valving assembly adapted to mount on a fuel tank and form a portion of a fuel vapor recovery system for the fuel tank, said valving assembly comprising:

a valve casing adapted to mount on the fuel tank to have at least a portion thereof extending downwardly into the fuel tank, said valve casing defining a hollow interior space and comprising a wall that is disposed across said valve casing hollow interior space and that has a vent opening for communicating with a vent outlet of the casing;

a bottom piece closing a lower end of said valve casing, said bottom piece having at least one opening allowing fuel in the tank to enter said valve casing and rise to a fuel level corresponding to that in the fuel tank;

a float slidably disposed in said valve casing; and, a seal assembly comprising a seal operable by said float for positioning against said valve casing wall by said float when said float has risen to a predetermined fuel level to seal said vent opening;

said seal assembly including an equalizing orifice extending past said seal for allowing said seal to be released when said float falls as the fuel level in the tank declines below the predetermined level; and said float including a main portion slidable in said valve casing and a central tubular portion projecting from said main portion, and said seal assembly including a sleeve slidably received in said tubular portion, said seal being disposed on an upper end of said sleeve and resting on a top of said central tubular portion of said float.

2. A valving assembly according to claim 1 further including an operating plunger slidable within said tubular portion, said plunger having an upper end adapted to move said sleeve to cause said seal to seal said vent opening, an inertia ball displaceable within said bottom piece for engaging a bottom portion of said plunger to push said plunger toward the vent opening when said ball is displaced.

3. A valving assembly according to claim 2 further including a plug disposed on the sleeve within said tubular central portion, said plug comprising an orifice, said seal comprising an opening into which said sleeve is received, and a hole in said central tubular portion of said float for providing restricted venting when said seal is sealing said vent opening, said plunger sealing said orifice when engaging said plug.

4. A valving assembly according to claim 2 wherein said bottom piece comprises a floor wall flaring outwardly and providing a surface for causing said ball to push said plunger to engage said seal assembly when the attitude of the casing is inclined beyond a predetermined amount from vertical.

5. A valving assembly according to claim 4 wherein said plunger bottom portion comprises an inverted cone, said inertia ball centering therein when the attitude of the casing is inclined from vertical by a further amount greater than the predetermined amount.

6. A vent control valving assembly that is adapted to mount on a fuel tank having a filler neck and to form a portion of a fuel vapor recovery system for the fuel tank, said valving assembly comprising:

a valve casing;

said valve casing comprising a first chamber adapted to have fuel vapor pressure in the tank communicated thereto;

a diaphragm mounted in said casing and having a side thereof defining in part said first chamber;

said valve casing comprising a second chamber defined in part by an opposite side of said diaphragm and adapted to be communicated to an entrance of the filler neck;

said valve casing comprising a diaphragm seat in said first chamber aligned with said diaphragm, said diaphragm being selectively movable to seated and unseated positions relative to said diaphragm seat in accordance with gas pressures acting on the sides of the diaphragm;

a bias assembly that urges said diaphragm to seated position on the seat when gas pressure is equalized on each side of the diaphragm;

a flow path that extends past the diaphragm seat to provide restrictive communication to a vent outlet of the casing when the diaphragm is seated on said diaphragm seat;

the flow path being unrestricted when said diaphragm is in unseated position away from said diaphragm seat during refueling of the fuel tank; and said diaphragm seat comprising a rim against which said diaphragm rests in seated position, said rim comprising a restrictive opening providing restriction in the flow path when the diaphragm is in seated position.

7. A vent control valving assembly that is adapted to mount on a fuel tank having a filler neck and to form a portion of a fuel vapor recovery system for the fuel tank, said valving assembly comprising:

a valve casing;

a valve casing comprising a first chamber adapted to have the fuel vapor pressure in the tank communicated thereto;

a diaphragm mounted in said casing and having a side thereof defining in part said first chamber;

said valve casing comprising a second chamber defined in part by an opposite side of said diaphragm and adapted to be communicated to an entrance of the filler neck;

said valve casing comprising a diaphragm seat in said first chamber and aligned with said diaphragm, said diaphragm being selectively movable to seated and unseated positions relative to said diaphragm seat in accordance with gas pressures acting on the sides of the diaphragm;

a bias assembly that urges said diaphragm to seated position on the seat when gas pressure is equalized on each side of the diaphragm;

a restrictive flow path extending across said diaphragm seat to provide restrictive communication to a vent outlet of the casing when said diaphragm is in seated position on said diaphragm seat;

an unrestricted flow path extending past said diaphragm when said diaphragm is in unseated position away from said diaphragm seat during refueling of the fuel tank, whereby venting to the vent outlet is restricted when the tank is not being refueled, and venting to the vent outlet is unrestricted when the tank is not being refueled;

said diaphragm comprising a pressure equalization orifice; and further including a seal for closing said equalization orifice when said diaphragm moves to a maximally unseated position away from the seat.

8. A valving assembly according to claim 4 in combination with such a fuel tank, and filler neck, including a check valve which is disposed between the entrance of the filler neck and the tank and through which fuel that has been introduced into the filler neck entrance passes into the fuel tank, and a filler neck vent passage communicating the second chamber and the entrance of the filler neck.

9. A vent control valving assembly adapted to mount on a fuel tank and form a portion of a fuel vapor recovery system for the fuel tank, said valving assembly comprising:

a hollow valve casing having at least a portion adapted to be disposed in an upper region of the fuel tank;

said casing portion comprising a perimeter wall having a series of window openings;

said casing comprising a transverse wall extending across said casing above the window openings;

a vent opening in said casing transverse wall communicating with a vent outlet of the casing; and a baffle arrangement include a skirt depending from said transverse wall within said perimeter wall and interposed between all of said window openings and said vent opening, whereby said skirt blocks liquid fuel from splashing through any of said window openings and directly into said vent opening.

10. A vent control valving assembly according to claim 9 wherein said baffle arrangement further includes a deflector disc spaced above and overlying said vent opening, and the casing comprises a support for supporting said disc to allow vapor to flow around a perimeter of the disc while the disc deflects liquid fuel passing through said vent opening.

11. A vent control valving assembly according to claim 10 wherein said support includes a plurality of spaced apart fingers projecting from said transverse wall and a series of spaced apart ribs on the casing around the perimeter of said deflector disc.

12. A vent control valving assembly that is adapted to mount on a fuel tank having a filler neck and to form a portion of a fuel vapor recovery system for the fuel tank, said valving assembly comprising:

a valve casing;

said valve casing comprising a first chamber adapted to have fuel vapor pressure in the tank communicated thereto;

a diaphragm mounted in said casing and comprising a side defining in part said first chamber;

said valve casing comprising a second chamber defined in part by an opposite side of said diaphragm and adapted to be communicated to an entrance of the filler neck;

said valve casing comprising a diaphragm seat in said first chamber aligned with said diaphragm, said diaphragm being selectively movable to seated and unseated positions relative to said diaphragm seat in accordance with gas pressures acting on the sides of the diaphragm;

a bias assembly that urges said diaphragm to seated position on said diaphragm seat when gas pressure is equalized on each side of the diaphragm;

an unrestricted flow path extending past said diaphragm when the diaphragm is in unseated position away from said diaphragm seat due to gas pressure differential acting on said diaphragm as a result of fuel being introduced into the fuel tank through the filler neck, whereby venting is unrestricted during refueling of the tank;

said diaphragm comprising an equalization orifice; and a seal for closing said orifice when said diaphragm is in maximally unseated position away from said diaphragm seat.

13. A vent control valving assembly as set forth in claim 12 further including such a fuel tank and filler neck, and still further including a filler neck vent passage communicating the second chamber and the entrance of the filler neck, and a check valve which is disposed between the filler neck entrance and the fuel tank and through which fuel that has been introduced into the filler neck entrance passes into the fuel tank.

14. A fuel tank vent control valve comprising:

a valve casing comprising a vent outlet;

said casing comprising a first chamber adapted to be communicated to an interior of a fuel tank;

a diaphragm mounted in said casing and comprising a side defining in part said first chamber;

said casing comprising a second chamber defined in part by an opposite side of said diaphragm;

a diaphragm seat in said first chamber aligned with said diaphragm, said diaphragm being movable to seated and unseated positions relative to said diaphragm seat;

a bias assembly that urges said diaphragm to seated position on said seat when gas pressure is equalized on each side of the diaphragm;

a restrictive flow path extending across said diaphragm seat to said vent outlet when said diaphragm is in seated position on said diaphragm seat;

an unrestricted flow path extending past said diaphragm when said diaphragm is in unseated position away from said diaphragm seat by gas pressure differential acting on said diaphragm as a result of fuel being introduced into the fuel tank during refueling, whereby venting is restricted when the fuel tank is not being refueled, and venting is unrestricted when the fuel tank is being refueled; and said diaphragm seat comprising a rim that is defined in said valve casing, said diaphragm resting on the rim when the diaphragm is in seated position, and said rim comprising a notch providing the restrictive flow path.

15. A fuel tank vent control valve comprising:

a valve casing having a vent outlet;

a first chamber in said valve casing adapted to be communicated to an interior of a fuel tank;

a diaphragm mounted in said casing and comprising a side defining in part said first chamber;

a second chamber in said valve casing defined in part by an opposite side of said diaphragm;

a diaphragm seat in said first chamber aligned with said diaphragm, said diaphragm being movable to seated and unseated positions relative to said diaphragm seat;

a bias assembly that urges said diaphragm to seated position on said seat when gas pressure is equalized on each side of the diaphragm;

a restrictive flow path extending across said diaphragm seat to said vent outlet when said diaphragm is in seated position on said diaphragm seat;

an unrestricted flow path extending past said diaphragm to the vent outlet when said diaphragm is moved to unseated position away from said diaphragm seat by gas pressure differential acting on said diaphragm during refueling of the tank, whereby venting to the vent outlet is restricted when the fuel tank is not being refueled, and venting to the vent outlet is unrestricted when the fuel tank is being refueled; and the diaphragm comprising a pressure equalization orifice; and further including a seal for closing said equalization orifice when said diaphragm moves to maximally unseated position away from the seat.

16. A fuel tank vent control valve comprising:

a valve casing comprising a wall bounding a hollow interior space into and from which fuel can ingress and egress and a vapor vent opening through a portion of the wall for venting fuel vapor from the hollow interior space;

a seal assembly for sealing said vapor vent opening;

a float that is disposed in said hollow interior space and that carries said seal assembly, said float including an inverted cup projecting away from said vapor vent opening, and said float including a tubular portion projecting from said cup toward said vapor vent opening; and said seal assembly including a sleeve slidably received in said tubular portion, and a seal disposed on a vertically upper end of said sleeve and resting on a vertically upper end of said tubular portion.

17. A fuel tank vent control valve comprising:

a valve casing comprising a wall bounding a hollow interior space into and from which fuel can ingress and egress and a vapor vent opening through a portion of the wall for venting fuel vapor from the hollow interior space;

a seal assembly for sealing said vapor vent opening;

a float that is disposed in said hollow interior space, that carries said seal assembly, and that comprises a cup projecting invertedly away from the vapor vent opening; and said casing comprising a wall comprising a stop that is abutted by a rim of said cup to define a limit of travel for said float away from said vapor vent opening.

18. A fuel tank vent control valve comprising:

a valve casing comprising a wall bounding a hollow interior space into and from which fuel can ingress and egress, and a vapor vent opening through a portion of the wall for venting fuel vapor from the hollow interior space;

a seal assembly for sealing said vapor vent opening;

a float that is disposed in said hollow interior space and that carries said seal assembly, said float including a cup projecting invertedly away from said vapor vent opening;

a passage having an entrance that is open to the hollow interior space and an exit that is open through said seal assembly to said vapor vent opening;

a gravity-responsive mechanism that closes said passage when the attitude of said casing changes by a predetermined amount from vertical; and said float including a central tubular portion projecting from said cup toward said vapor vent opening, said tubular portion forming a portion of said passage, and said gravity-responsive mechanism comprising a plunger extending within said tubular portion for selectively engaging the seal assembly.

19. A fuel tank vent control valve as set forth in claim 18 including an orifice member that is disposed within said tubular portion and that is abutted by said plunger to close said passage.

20. A fuel tank vent control valve as set forth in claim 19 wherein said orifice member is also disposed on said seal assembly.

21. A fuel tank vent control valve comprising:

a valve casing comprising a wall bounding a hollow interior space into and from which fuel can ingress and egress, and a vapor vent opening through a portion of the wall for venting fuel vapor from the hollow interior space;

a float that reciprocates between a first position and a second position within said casing;

a seal operated by the float for sealing said vapor vent opening when said float is in the first position;

said casing wall comprising a stop which said float abuts in the second position; and said float including a cup projecting invertedly away from said vapor vent opening, said cup abutting said stop when the float is in the second position.

22. A fuel tank vent control valve as set forth in claim 21 wherein said casing comprises at least one opening which is disposed vertically below a lower rim of said cup and via which fuel can ingress to and egress from the hollow interior space.

23. A fuel tank vent control valve as set forth in claim 22 wherein casing comprises plural parts assembled together, one of said parts being a bottom part that contains said at least one opening.

24. A fuel tank vent control valve as set forth in claim 21 wherein said seal is part of a seal assembly that is carried by said float.

25. A fuel tank vent control valve comprising:

a valve casing comprising a vapor vent opening for venting fuel vapor from a hollow space of the casing into and from which fuel can ingress and egress;

a float that reciprocates between a first position and a second position within said casing and that comprises a tubular portion;

a seal operated by the float for sealing said vapor vent opening when said float is in the first position;

said casing comprising a stop which said float abuts in the second position; and the seal being part of a seal assembly that includes a sleeve slidably received in said tubular portion, and said seal being disposed on a vertically upper end of said tubular portion and resting on a vertically upper end of said tubular portion.

26. A fuel tank vent control valve as set forth in claim 25 further including a passage defined at least in part by said tubular portion, and having an entrance that is open to the hollow interior space and an exit that is open through said seal to said vapor vent opening.

27. A fuel tank vent control valve as set forth in claim 26 further including a gravity-responsive mechanism that closes said passage when the attitude of said casing changes from vertical beyond a predetermined amount.

28. A fuel tank vent control valve as set forth in claim 27 wherein said gravity-responsive mechanism comprises a plunger extending within said tubular portion.

29. A fuel tank vent control valve as set forth in claim 28 including an orifice member that is disposed within said tubular portion and that is abutted by said plunger to close said passage.

30. A fuel tank vent control valve as set forth in claim 29 wherein said orifice member is also disposed on said seal assembly.

31. A vent control valving assembly as set forth in claim 1 wherein said bottom piece is a separate part attached to said casing.

32. A vent control valving assembly as set forth in claim 6 in which the restrictive opening comprises a notch in an edge of the rim.

* * * * *